United States Patent
Cheng et al.

(10) Patent No.: US 6,497,857 B1
(45) Date of Patent: Dec. 24, 2002

(54) SYNTHESIS OF HYDROTHERMALLY STABLE METAL INCORPORATED MESOPOROUS MOLECULAR SIEVE OF MCM-41 TYPE

(75) Inventors: Soofin Cheng, Taipei (TW); Debasish Das, Taipei (TW)

(73) Assignee: Chinese Petroleum Corporation, Taipei (TW)

( * ) Notice: Subject to any disclaimer, the term of this patent is extended or adjusted under 35 U.S.C. 154(b) by 0 days.

(21) Appl. No.: 09/512,146

(22) Filed: Feb. 23, 2000

(30) Foreign Application Priority Data

Jan. 20, 2000 (TW) .......................... 89100858 A

(51) Int. Cl.⁷ .......................... C01B 33/20; C01B 37/00
(52) U.S. Cl. .................. 423/702; 423/705; 423/326; 423/328.2; 423/335
(58) Field of Search .................... 423/702, 705, 423/326, 328.2, 335, 338, 339

(56) References Cited

U.S. PATENT DOCUMENTS

| 5,098,684 | A | * | 3/1992 | Kresge et al. | |
|---|---|---|---|---|---|
| 5,112,589 | A | * | 5/1992 | Johnson et al. | |
| 5,308,602 | A | * | 5/1994 | Calabro et al. | 423/705 |
| 5,855,864 | A | * | 1/1999 | Pinnavaia et al. | 423/708 |
| 5,876,690 | A | * | 3/1999 | Mou et al. | 423/702 |
| 5,942,208 | A | * | 8/1999 | Ryoo et al. | 423/705 |
| 5,958,368 | A | * | 9/1999 | Ryoo et al. | 423/701 |

* cited by examiner

Primary Examiner—David Sample
(74) Attorney, Agent, or Firm—Christensen O'Connor Johnson Kindness PLLC

(57) ABSTRACT

The present invention provides methods for preparing hydrothermally stable MCM-41 mesoporous molecular sieves incorporating aluminum and other transition metals. The materials prepared by these methods possess a very high surface area and narrow uniform pore distribution in the mesopore region, and are highly thermally stable whereby the ions are not leached out after high temperature annealing.

23 Claims, No Drawings

SYNTHESIS OF HYDROTHERMALLY STABLE METAL INCORPORATED MESOPOROUS MOLECULAR SIEVE OF MCM-41 TYPE

This invention relates to inorganic mesoporous molecular sieves of MCM-41 type. This type of material has high thermal stability, well defined uniform pore openings in the mesopore range, 15 to 100 Å and possesses very high surface area (>1000 m$^2$/g). The pore openings also can be tailored during the synthesis process by using surfactant groups of suitable chain length.

These materials attracted considerable attention in recent years for their potential use in catalysis. Due to the large pore openings catalytic conversion of bulkier molecules as encountered in the cracking of heavy crude oils or in the manufacture of fine chemicals and pharmaceuticals can be performed easily on these mesoporous molecular sieves.

Incorporation of metal atoms to the framework of mesoporous molecular sieve can generate active sites for catalysis. Incorporation of aluminum generates acidity in the framework. Other elements like vanadium, titanium can also be incorporated in the framework.

The main drawback of the application of MCM-41 molecular sieve in catalysis is its low stability in presence of water vapor and in many reactions water is formed as by-product during the reaction. Also many catalytic processes have to go through very harsh conditions. The practical application of these mesoporous molecular sieve will be slow unless their poor hydrothermal stability is improved. Improvement of the hydrothermal stability of mesoporous molecular sieve has been reported to be achieved by controlling the pH of the gel during the synthesis conditions. However, the described method is exhausting and requires multiple adjustment of pH and hydrothermal treatment of the gel.

Accordingly, it is an object of the present investigation to provide MCM-41 mesoporous molecular sieve which possesses high hydrothermal stability.

Another object of -the invention is to provide a simple and economical method by which hydrothermally stable MCM-41 molecular sieve can be prepared.

A further object of the invention is to provide hydrothermally stable mesoporous molecular sieve which possesses high thermal stability and surface area for application as catalyst or catalyst support.

Yet another object of the invention is to provide hydrothermally stable mesoporous molecular sieve in which silicon atoms are substituted with other elements to generate active sites.

Still other objects and advantages of the invention will in part be obvious and will in part be apparent from the specification.

Broadly, our invention contemplates the preparation of hydrothermally stable MCM-41 mesoporous molecular sieves.

More specifically, we have found that the hydrothermal stability of MCM-41 mesoporous molecular sieves may be greatly improved by addition of cations like tetra-alkyl ammonium or sodium ions in the synthesis gel. Similar method was also applied for the synthesis of aluminum and other transition metal containing MCM-41 mesoporous molecular sieves. These synthesized materials possess high stability in water at elevated temperatures. Our pure silica and transition metal incorporated MCM-41 molecular sieves are characterized by high surface area in the order of 900 to 1100 m$^2$/g. Furthermore, they possess a hexagonal crystal structure as evidenced from the X-ray powder diffraction analysis. Pore size distribution indicates that a large percentage of the pore volume is in the mesopore region, 18 to 100 Å, which is highly desirable for their catalytic application.

Hydrothermally stable MCM-41 mesoporous molecular sieve is prepared by making a gel containing surfactant, inorganic silicate, tetra-alkyl cation and water. The reactants are mixed to provide ratios for the ingredients defined as follows:

surfactant/silica . . . 0.1 to 1 tetra-alkyl cation/surfactant . . . 0 to 2

H$^2$0/silica . . . 50 to 250

Si/M . . . ≦5

Reactant gels defined above are reacted for periods from about 2 hour to 4 days at temperature ranging from 250° C. to 60° C. In preparing the reaction mixtures, surfactant of the general chemical formula, $C_nH_{2n+1}(CH_3)_3N^+X^-$ (where n=12 to 18 and x=Cl, Br) was mixed with tetra-alkyl ammonium cation of the general chemical formula, $C_nH_{2n+1}N^+X^-$ (where n=1 to 3 and X=Cl, Br) before addition of the silicate or metal source.

In a particularly preferred method for preparing hydrothermally stable MCM-41 mesoporous molecular sieves tetra-alkyl ammonium salt solution was slowly mixed with the surfactant solution. The mixture was stirred vigorously for a period of 30 to 60 minutes. To this mixture a solution of inorganic silicate was slowly added and further stirred vigorously for 45–60 minutes. The mixture was then slowly acidified with a dilute mineral acid until pH 9.5 to 10 reached. This gel mixture was aged for 2 hours to 2 days at temperature of 25° C. to 600° C. Subsequent to aging, the mixture was transferred to polypropylene bottles, sealed and kept at 100° C. for 2 to 4 days without agitation. Finally, the bottles were quenched in cold water and the mixture was filtered to recover the solid product which was washed thoroughly with deionized water. To prepare substituted MCM-41 mesoporous molecular sieve suitable metal salt solution was added to the surfactant mixture. Typically, addition of metal salt solution was followed by the addition of silicate solution. The solid material obtained was dried at a temperature of 50 to 70° C., followed by calcining at a temperature of 500 to 560° C. The final product possesses a high surface area in the range of 1000 to 1200 m$^2$/g and X-ray diffraction analysis shows well defined hexagonal pattern. Pore size distribution indicates that most of the pore volume is in the mesopore region, 18 to 100 Å.

Having described the basic aspects of the present invention the following examples are given to illustrate specific embodiments thereof.

EXAMPLE 1

This example illustrates the use of tetra-propyl ammonium bromide as an additional salt.

A solution containing 2.13 g cetyltrimethyl ammonium bromide was mixed with 2.13 g. tetra-propyl ammonium bromide dissolved in 10 g water. The mixture was stirred at 27° C. for 1 hour. To this mixture 5.35 g sodium silicate solution (~14% NaOH, ~27% SiO$_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hour possessed a surface area of 1030 m$^2$/g and regular hexagonal X-ray diffraction pattern. The pore volume distribution in the mesopore region was 0.76 cm$^3$/g.

EXAMPLE 2

This example illustrates the use of tetra-ethyl ammonium bromide as an additional salt.

A solution containing 2.12 g cetyltrimethyl ammonium bromide was mixed with 1.68 g. tetra-ethyl ammonium bromide dissolved in 10 g water. The mixture was stirred at 27° C. for 1 hour. To this mixture 5.30 g sodium silicate solution (~14% NaOH,~27% SiO$_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possesses a surface area of 1010 m$^2$/g and regular hexagonal X-ray diffraction pattern. The pore volume distribution in the mesopore region was 0.80 cm$^3$/g.

EXAMPLE 3

This example illustrates the use of tetra-methyl ammonium bromide as an additional salt.

A solution containing 2.13 g cetyltrimethyl ammonium bromide was mixed with 1.23 g. tetra-methyl ammonium bromide dissolved in 10 g water. The mixture was stirred at 27° C. for 1 hour. To this mixture 5.35 g sodium silicate solution (~14% NaOH, ~27% SiO$_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possesses a surface area of 1045 m$^2$/g and regular hexagonal X-ray diffraction pattern. The pore volume distribution in the mesopore region was 0.87cm $^3$/g.

EXAMPLE 4

This example illustrates the use of sodium bromide as an additional salt.

A solution containing 2.13 g cetyltrimethyl ammonium bromide was mixed with 0.825 g. sodium bromide dissolved in 10 g water. The mixture was stirred at 27° C. for 1 hour. To this mixture 5.35 g sodium silicate solution (~14% NaOH, ~27% SiO$_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possesses a surface area of 1020 m$^2$/g and regular hexagonal X-ray diffraction pattern. The pore volume distribution in the mesopore region was 0.80 cm$^3$/g.

EXAMPLE 5

Samples prepared by the way of the examples 1 to 4 above were subjected to hydrothermal test by mixing about 0.250 g of the calcined sample with 20 to 30 g deionized water and heating statically at 100° C. for 4 to 7 days in polypropylene bottles. To compare the hydrothermal stability a sample of MCM-41 prepared without addition of any cation was also tested under identical conditions. The X-ray analysis showed that while the structure of the sample without additional cation collapsed drastically those of the samples prepared with additional cation remained almost intact. Nitrogen adsorption isotherm indicated that the major part of the mesopore structure was destroyed when no additional cation was added.

EXAMPLE 6

This example illustrates the use of cetyltrimethyl ammonium chloride (25 wt. %) solution as the surfactant and tetra-propyl ammonium bromide as an additional salt.

An aqeous solution containing 7.48 g cetyltrimethyl ammonium chloride (25 wt.%) was mixed with 2.13 g. tetra-propyl ammonium bromide dissolved in 10 g water. The mixture was stirred at 27° C. for 1 hour. To this mixture 5.35 g sodium silicate solution (~14% NaOH, ~27% SiO$_2$) in 15 g water was added slowly with vigorous stirring. The pH of the mixture was brought down to 9.5 to 10.0 by slow addition of 1.2 M sulfuiric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possesses a surface area of 1070 m$^2$/g and regular hexagonal X-ray diffraction pattern. The pore volume distribution in the mesopore region was 0.83 cm$^3$/g.

EXAMPLE 7

This example illustrates a method of preparing metal incorporated hydrothermally stable MCM-41 mesoporous molecular sieves using tetra-propyl ammonium bromide as an additional salt.

A solution containing 2.13 g cetyltrimethyl ammonium bromide was mixed with 2.12 g. tetra-propyl ammonium bromide dissolved in 10 g water. The mixture was stirred at 27° C. for 1 hour. To this mix a solution of 0.134 g CoSO$_4$.7H$_2$O was added dropwise and stirred continuously. To this mixture 5.35 g sodium silicate solution (~14% NaOH, ~27% SiO$_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possesses a surface area of 1060 m$^2$/g and regular hexagonal X-ray diffraction pattern. The pore volume distribution in the mesopore region was 0.78 cm$^3$/g.

EXAMPLE 8

This additional example illustrates a method of preparing metal incorporated hydrothermally stable MCM-41 mesoporous molecular sieves using tetra-propyl ammonium bromide as an additional salt.

A solution containing 2.13 g cetyltrimethyl ammonium bromide was mixed with 2.12 g. tetra-propyl ammonium bromide dissolved in 10 g water. The mixture was stirred at 27° C. for 1 hour. To this mixure a solution of 0.192 g $Fe(NO_3)_3 \cdot 9H_2O$ was added dropwise and stirred continuously. To this mixture 5.35 g sodium silicate solution (~14% NaOH, ~27% $SiO_2$) in 15 g water was added slowly with vigorous stirring. The pH of the mixture was brought down to 9.5 to 10.0 by slow addition of 1.2 M sulfuric acid solution. The resulting gel was aged for 2 hours at 27° C., transferred to polypropylene bottles and statically heated at 100° C. for 4 days. The solid product obtained was filtered and washed with deionized water to remove unreacted chemicals. The solid product as recovered from the reaction mixture and calcined at 560° C. for 6 hours possessed a surface area of 1050 $m^2/g$ and regular hexagonal X-ray diffraction pattern. The pore volume distribution in the mesopore region was 0.80 $cm^3/g$.

We claim:

1. A method of making an MCM-41-type mesoporous material having hydrothermal stability, comprising the steps of:
   (a) combining a solution of quaternary ammonium salts having the formula $(CH_3)_3(C_nH_{2n+1})N^+X^-$; wherein n=12–18 and $X^-$ is at least one of $Cl^-$ and $Br^-$, with at least one of:
      (i) a solution of quaternary ammonium salts having the formula of $(C_nH_{2n+1})_4N^+X^-$, where n=1–3; and
      (ii) a solution of quaternary ammonium salts having the formula of $(C_nH_{2n+1})_4N^+X^-$, wherein n=1–3, and $X^-$ is at least one of $Cl^-$ and $Br^-$;
   (b) adding a silicon source to the first mixture to form a second mixture, wherein the pH of the second mixture is adjusted to a pH within the range of 9.5 to 10;
   (c) heating the second mixture to form MCM-41 mesoporous material.

2. The method of claim 1, wherein the heating of the seccond mixture is performed at a temperature of 100 to 150 degrees Celsius for 2 to 4 days.

3. The method of claim 1, wherein the adjusting the pH is performed using a mineral acid.

4. The method of claim 3, wherein the mineral acid of step (b) is at least one of $H_2SO_4$, $HNO_3$ and HCl.

5. The method of claim 1, further comprising the steps of:
   (d) filtering the MCM-41-type mesoporous material from the second mixture; and
   (e) washing and drying the filtered MCM-41-type mesoporous material.

6. A method of making an MCM-41-type mesoporous material having hydrothermal stability, consisting of:
   (a) preparing a first mixture consisting of a solution of quaternary ammonium salts having the formula $(CH_3)_3(C_nH_{2n+1}) N^+X^-$; wherein n=12–18 and $X^-$ is at least one of $Cl^-$ and $Br^-$, and a solution of alkali metal salts to form a first mixture;
   (b) adding a silicon source to the first mixture to form a second mixture, wherein the pH of the second mixture is adjusted to a pH within the range of 9.5 to 10;
   (c) heating the second mixture to form the MCM-41-type mesoporous material.

7. The method of claim 6, wherein the of alkali metal salt has the formula $M^+X^-$, wherein $M^+$ is at least one of $Li^+$, $Na^+$, $K^+$, and $Cs^+$, and $X^-$ is at least one of $Cl^-$ and $Br^-$.

8. The method of claim 7, wherein the heating of the second mixture of step (c) is performed at a temperature of 100 to 150 degrees Celsius for 2 to 4 days.

9. The method of claim 6, wherein the adjusting the pH is performed using a mineral acid.

10. The method of claim 9, wherein the mineral acid is one of $H_2SO_4$, $HNO_3$ and HCl.

11. The method of claim 7, further comprising the steps of:
   (d) filtering the MCM-41-type mesoporous material from the second mixture; and
   (e) washing and drying the filtered MCM-41-type mesoporous material.

12. A method of making a metal-containing MCM-41-type mesoporous material having hydrothermal stability, comprising the steps of:
   (a) combining a solution of quaternary ammonium salts having the formula $(CH_3)_3(C_nH_{2n+1})N^+X^-$, wherein n=12–18 and $X^-$ is at least one of $Cl^-$ and $Br^-$, with at least one of:
      (i) a solution of quaternary ammonium salts having the formula of $(C_nH_{2n+1})_4N^+$, where n=1–3; and
      (ii) a solution of alkali metal salts to form a first mixture;
   (b) adding a metal source to the first mixture to form a second mixture;
   (c) adding a silicon source to the second mixture to form a third mixture, wherein the pH of the second mixture is adjusted to a pH within the range of 9.5 to 10;
   (d) heating the third mixture to form a metal-containing MCM-41-type mesoporolus material.

13. The method of claims 12, wherein the metal source is a source of at least one of Al, Ti, V, Cr, Mn, Fe, Co, Ni, Cu, and Zn.

14. The method of claim 12, wherein the heating of the third mixture is performed at a temperature of 100 to 150 degrees Celsius for 2 to 4 days.

15. The method of claim 12, wherein the adjusting the pH is performed using a mineral acid.

16. The method of claim 15, wherein the mineral acid is one of $H_2SO_4$, $HNO_3$ and HCl.

17. The method of claim 12, further comprising the steps of:
   (e) filtering the metal-containing MCM-41-type mesoporous material from the third mixture; and
   (f) washing and drying the filtered metal-containing MCM-41-type mesoporous material.

18. A method of making a metal-containing MCM-41-type mesoporous material having hydrothermal stability, comprising the steps of:
   (a) combining a solution of quaternary ammonium salts having the formula $(CH_3)_3(C_nH_{2n+1}) N^+X^-$; wherein n=12–18 and $X^-$ is at least one of $Cl^-$ and $Br^-$, with at least one of:
      (i) a solution of quaternary ammonium salts having the formula of $(C_nH_{2n+1})_4N^+$, where n=1–3; and
      (ii) a solution of alkali metal salts to form a first mixture;
   (b) combining a metal source with a silicon source to form a second mixture;
   (c) combining the first mixture with the second mixture to form a third mixture, wherein the pH of the second mixture is adjusted to a pH within the range of 9.5 to 10;
   (d) heating the third mixture at a temperature to form a metal-containing MCM-41-type mesoporous material.

19. The method of claim 18, wherein the metal source is a source of at least one of Al, Ti, V, Cr, Mn, Fe, Co, Ni, Cu, and Zn.

20. The method of claim 18, wherein the heating of the third mixture is performed at a temperature of 100 to 150 degrees Celsius for 2 to 4 days.

21. The method of claim 18, wherein the adjusting the pH is performed using a mineral acid.

22. The method of claim 21, wherein the mineral acid is one of $H_2SO_4$, $HNO_3$ and HCl.

23. The method of claim 18, further comprising the steps of:

(e) filtering the metal-containing MCM-41-type mesoporous material from the third mixture; and (f) washing and drying the filtered metal-containing MCM-41-type mesoporous material.

* * * * *

UNITED STATES PATENT AND TRADEMARK OFFICE
CERTIFICATE OF CORRECTION

PATENT NO.     : 6,497,857 B1
DATED          : December 24, 2002
INVENTOR(S)    : S. Cheng et al.

It is certified that error appears in the above-identified patent and that said Letters Patent is hereby corrected as shown below:

<u>Column 5,</u>
Line 24, "$N^+X^-$," should read -- $N^+$, --
Line 35, "seccond" should read -- second --
Lines 49-50, "$(CH_3)$
          $_3(C_nH_{2n+1})$" should break as
          -- $(CH_3)_3$
          $(C_nH_{2n+1})$ --
Line 61, "claim 7," should read -- claim 6, --

Signed and Sealed this

Eighth Day of July, 2003

JAMES E. ROGAN
*Director of the United States Patent and Trademark Office*